UNITED STATES PATENT OFFICE.

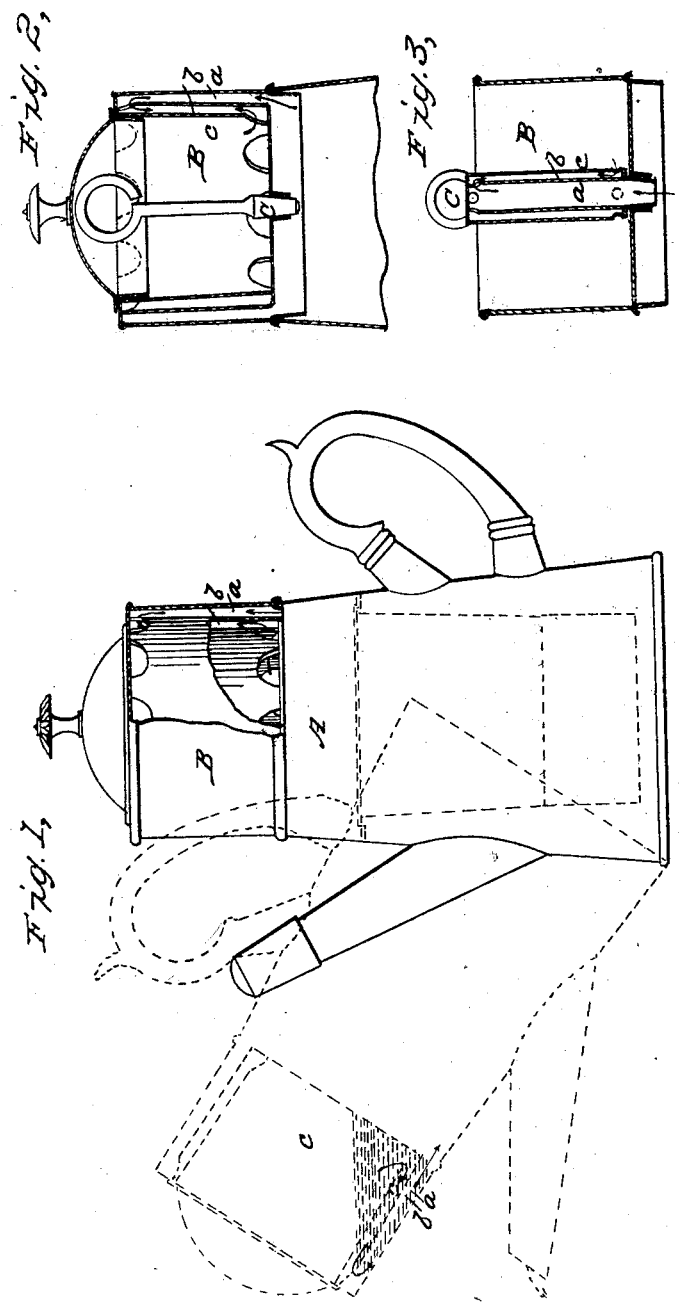

NELSON BARLOW, OF NEW YORK, N. Y.

COFFEE-POT.

Specification of Letters Patent No. 21,808, dated October 19, 1858.

*To all whom it may concern:*

Be it known that I, NELSON BARLOW, of the city, county, and State of New York, have invented a new and useful Improvement in Coffee-Pots; and I do hereby declare that the following is a full and exact description thereof, reference being had to the accompanying drawings.

The general nature of the invention is an improved condensing arrangement whereby the vapor and aroma is retained, and also a graduated means for returning the same to the boiler.

A (Figure 1) is the boiler or coffee pot within which a strainer (shown by red lines) may be used if desired. The boiler should have a cap on the end of the spout and its joints well fitted to prevent the escape of steam. Further description will be unnecessary.

Upon the top of the boiler is fitted the condensing vessel B, (Figs. 1 and 2,) which forms a cover to it, and in turn has a cap or cover for itself. Within the vessel (B,) are two tubular partitions, placed one within the other, giving the spaces $a$, $b$, between the outer case and inner division and the chamber $c$, within all. The inner tube has a series of openings around its lower edge where it connects with the bottom of the vessel or cup, and the other or intermediate partition has similar openings at its upper end where it connects with the top. There is thus by this arrangement open communication between the internal chamber $c$, and the boiler.

Coffee and water are placed within the boiler in the usual manner for preparation. The cup B, $c$ is then filled with cold water, which flows up the space $b$ to its own level. The steam from the boiling coffee ascends up the space $a$, encompassing on all sides the condensing vessel, and passes through the openings in the upper part of the intermediate partition into the space $b$, where it comes into contact with the water surrounding the inner partition and is thereby condensed, and the aroma which is of a volatile nature and which by other means would escape—is retained hereby and deposited in the water. When the boiling is completed it is essential that the water in the cup B, $c$, containing the condensed aroma should be discharged into and incorporated with the coffee. This is effected as shown by dotted lines at Fig. 1, by the act of pouring the coffee from the boiler. When the coffee pot is inclined as in the act of pouring from the spout, it will be seen that the liquid contained in the cup ($c$) flows up the space $b$, and down the space $a$, into the boiler, and the quantity thus returned is proportional to the coffee poured out, and when the boiler is emptied the cup will be emptied also. It is thus self regulating and graduated in its action. Operating in this manner it is divested of complexity, no mistake can occur in the hands of inexperienced servants. This also gives the important advantage, when, after pouring a part and the remainder is required to stand for subsequent use,—condensation continues in the water which remains. The cup may be in the form of an inverted cone so as to deliver its contents sooner than when its sides are vertical.

In Fig. 2 is shown a modification of the above in furnishing the cup with a stopper C, which is fitted to a hole in the bottom of the same, and in Fig. 3 is a further modification. The stopper (as above) is made tubular combining in itself means of condensing, the steam passing up the tube $a$, over and down the space $b$, into contact with cold water as before described. In either case after condensation by withdrawing the stopper C, which is conveniently done with the fingers—the contents of the cup (or a part, as desired) descends to the boiler. These modifications are adapted especially to cases where the boiler is a fixture and the coffee is drawn by a faucet. A stopper thus placed gives a convenient and simple means of returning the contents of the cup to the boiler, in cases where the other plan is not adapted. A single tube or partition with openings around its upper edge, giving the space $a$, for the steam to ascend, from whence it passes inward over the surface of the water, may be used, combined with the means described for discharging the water H, but condensation would be less perfect than in the other plan described. More or less cold water may be used in the cup c, to produce the desired result.

Having thus fully described my invention what I claim therein as new and desire to secure by Letters Patent, is:—

The tubular condensing vessel (B, c) in its specified arrangement, when cold water is used in the same and the discharge is graduated in the manner described.

NELSON BARLOW.

Witnesses:
HARVEY BROWN,
E. A. BROWN.